Patented Mar. 19, 1946

2,396,786

UNITED STATES PATENT OFFICE 2,396,786

CHEMICAL PRODUCT AND PROCESS FOR MAKING THE SAME

William E. Hanford, Easton, Pa., assignor to E. I. du Pont de Nemours & Company, Wilmington, Del., a corporation of Delaware No Drawing. Application April 23, 1943, Serial No. 484,213

27 Claims. (Cl. 260—578)

This invention relates to the preparation of polyaromatic nitro compounds by the nitration of aromatic telomers.

It is known that nitro groups may be introduced into organic molecules containing benzenoid nuclei by the action of nitrating agents such as fuming nitric acid or a mixture of nitric and sulfuric acids. It is also known that these nitro compounds may be reduced to the corresponding amino compounds which may then be linked with other molecules by the diazotization and coupling reactions to give dyestuffs or pigments. The properties of the derivatives, such as color, solubility and stability to light, depend to a great extent upon the chemical constitution of the nitrated organic compounds which are used in their preparation.

It is an object of this invention to prepare new nitro and amino compounds. Another object is to provide new polynitro and polyamino compounds having at least one other substituent. A further object is to prepare nitro and amino substituted telomers. Other objects will appear hereinafter.

These objects have been accomplished by nitrating the aromatic nuclei of a telomer, each taxomon unit of which contains an aromatic nucleus, and reducing the resulting nitro compounds to amino compounds.

Telomers are new types of compounds produced by a process called "telomerization." In copending U. S. application Serial No. 438,466, filed April 10, 1942, it has been pointed out that the novelty of this reaction is such that, for adequate description, it has been found necessary to coin new terms to describe the reaction and the participants therein. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula $Y(A)_nZ$, wherein $(A)_n$ is a divalent radical formed by the chemical union, with the formation of new carbon bonds, of the taxogen, the unit A being called a "taxomon," $n$ being any integer greater than one, and Y and Z being fragments of the telogen attached to the terminal taxomons.

Telomers of aromatic taxogens are new compositions of matter described in pending U. S. application Serial No. 464,519, filed November 4, 1942. They are prepared by the reaction of aromatic taxogens, i. e., polymerizable olefinic compounds containing aromatic substituents (such as styrene, vinyl benzoate, etc.) with telogens, i. e., telomerizing agents (such as carbon tetrachloride, ethyl trichloroacetate, hydrochloric acid, etc.). The preparation of such telomers is fully described in U. S. application Serial No. 464,519, filed November 4, 1942, which is made a part of this disclosure by reference.

A monomeric taxogen, such as styrene, is heated with 1 to 3 molecular equivalents of the telogen and approximately 0.01 molecular equivalent of a telomerization catalyst, such as benzoyl peroxide, at 100–150° C. for a period of about 8 hours. The product is separated from the excess of telogen and from any remaining monomeric styrene by a suitable process, such as, for example, distillation or steam distillation. The reaction temperature and the concentrations of the reactants are chosen to give a product having the desired molecular weight, according to the general rule that the average molecular weight of the product is decreased by using a higher temperature or by increasing the concentration of the telogen. When one mole of styrene is heated with two moles of carbon tetrachloride and 0.004 mole of benzoyl peroxide at 86° C. for 70 hours, the product, $Cl-(C_2H_3 \cdot C_6H_5)_n-CCl_3$, is found to have an average chain length, $n$, of 21 styrene units. When 1.3 moles of carbon tetrachloride are used and the temperature is maintained at 120° C. for 8 hours, the product is found to have a chain length, $n$, of 15. When styrene is heated with 2 moles of bromoform and 0.0066 mole of benzoyl peroxide at 90 to 120° C. for 24 hours, the product, after separation from excess bromoform by distillation under diminished pressure, is found to have an average chain length of 8 styrene units. Ethyl trichloroacetate gives a product of even lower molecular weight.

A telomer of an aromatic taxogen is treated with a nitrating agent to produce a polynitro compound. The product contains a multiplicity of nitro groups and at least one other substituent, the latter being derived from a fragment of the telogen used in the preparation of the telomer. By "nitrating agent" is meant any reagent capable of introducing a nitro group into a benzenoid nucleus. It has been found that the telomers may be nitrated by the same reagents known to be effective for monomeric aromatic organic compounds, for example, fuming nitric acid.

The nitrated telomers are reduced to the corresponding amino compounds by the usual agents for the reduction of nitro groups, such as, for example, powdered iron and aqueous acetic acid, tin and hydrochloric acid, or catalytic hydrogenation. The nitrated styrene telomers are much easier to reduce than are nitrated polymers such as polystyrene. Thus, a nitrated styrene/carbon tetrachloride telomer such as the above can be suspended in a solvent such as glacial acetic acid and reduced by the action of hydrogen in the presence of a palladium-on-charcoal catalyst.

In order that the invention may be more fully understood, the following examples are given by way of illustration. Parts are by weight.

*Example I*

A styrene-carbon tetrachloride telomer containing 6.75% chlorine (average molecular weight 2100, average composition $$Cl-(C_2H_3.C_6H_5)_{18.7}-CCl_3)$$

is ground to a fine powder. Twenty parts of the telomer is then added in small portions to 150 parts of fuming nitric acid (specific gravity 1.49) while the mixture is stirred and cooled to maintain a temperature of 10 to 15° C. The telomer dissolves readily in the acid to give a clear, dark solution. As soon as all of the telomer is dissolved, the solution is poured into a large volume of pure ice-water. The yellow precipitate is washed with water until free of acid, filtered off, and dried in vacuum. The yield is quantitative, and the product contains approximately one nitro group per benzenoid nucleus, as shown by the nitrogen content.

|  | Nitrogen | Chlorine |
|---|---|---|
|  | *Percent* | *Percent* |
| Found | 8.37 | 4.35 |
| Calc'd. for $Cl-(C_2H_3.C_6H_4.NO_2)_{18.7}-CCl_3$ | 8.91 | 4.83 |

By fractional crystallization of the styrene telomer itself individual telomers may be obtained which can be nitrated as above to give the corresponding nitro compounds. These can be reduced as in Examples II and III to the corresponding amino compounds.

*Example II*

A nitrated styrene-carbon tetrachloride telomer having an average composition corresponding to $Cl(C_2H_3.C_6H_4NO_2)_{18.7}.CCl_3$ is ground with 3.3 parts of reduced iron powder and 3.3 parts of 50% aqueous acetic acid. After stirring for several hours the mixture is diluted with water and warmed on a steam bath for one hour. It is then neutralized by the addition of sodium carbonate and extracted with ether. The amine is isolated by evaporation of the ether extract. It is insoluble in water but dissolves in hydrochloric acid to give a solution of the amine hydrochloride which can be diazotized and coupled with other compounds by ordinary procedures.

*Example III*

Nine parts of a nitrated styrene-carbon tetrachloride telomer, obtained as in Example I, is dissolved in 50 parts of glacial acetic acid and 5 parts of an aqueous suspension of palladium-on-charcoal catalyst (containing 0.025 part of palladium) is added. After hydrogenation by heating at 150 to 200° C. until hydrogen is no longer absorbed, the mixture is cooled, centrifuged and filtered. Ammonium hydroxide is then added to the solution and the precipitate is filtered and purified by crystallization from a water-acetone solution. Two parts of this product are refluxed with 50 parts of constant boiling hydrochloric acid for fifteen minutes. The aminostyrene-carbon tetrachloride product is obtained by neutralization with ammonium hydroxide and is soluble in dilute mineral acids.

A polynitro compound can be prepared from any telomer containing aromatic nuclei. Preferably the telomer has from 2 to 30 taxomon units, each of which contains an aromatic hydrocarbon nucleus. It is also preferred that the telomer have a halogen in an end group.

The taxogens can be aromatic compounds, having side chain olefinic unsaturation, such as styrene, alpha-methyl styrene, beta-ethyl styrene, 1-vinyl-4-chlorobenzene, 1,4-divinylbenzene, vinyl naphthalenes, indene, etc. The preferred taxogens are polymerizable aromatic mono-olefinic hydrocarbons. Especially preferred are aromatic vinyl compounds of from 8 to 12 carbon atoms, such as styrene, nuclear substituted styrenes, and vinyl naphthalene.

Hydrogen chloride and saturated estadrides of inorganic acids are suitable telogens. Halogenated derivatives of aliphatic hydrocarbons, such as $CCl_4$, $CHCl_3$, $CH_2Cl_2$, $CH_2ClI$, $CH_3CCl_3$, $CH_3Br$, and especially halogenated methanes having at least 2 halogen atoms, are preferred estadrides.

The telomer may be nitrated with fuming nitric acid in the presence or absence of a solvent. The use of an inert solvent such as nitrobenzene is especially advantageous if it is desired to introduce less than 1 nitro group per aromatic nucleus. The telomer dissolves and undergoes reaction with the evolution of heat, and it is generally desirable to regulate the speed of the reaction at the outset by adding the telomer to the nitration mixture in small portions with efficient stirring and, if necessary, cooling. Products containing approximately 1 nitro group per aromatic nucleus are preferred for most purposes, and these are in general obtained by dissolving the telomer in 3 to 10 parts of fuming nitric acid at room temperature or below, and then allowing the mixture to stand at room temperature for several hours. The mixture is then poured into cold water, whereupon the nitro compound separates as a precipitate. It is filtered and washed with water until free of acid.

The extent of nitration can be varied at will by controlling the temperature and concentration of the nitrating agent. Nitrated telomers can then be made which contain from 2 nitro groups per telomer to 2 nitro groups per aromatic nucleus.

The nitro-substituted telomers can be reduced to the corresponding amino compounds by means known in the art, and Examples II and III illustrate this step. The amino telomers are capable of forming salts with acids, and these salts are soluble in water. Treatment of the aqueous solution of the hydrochloride of a polyamino telomer with a diazotizing agent, such as sodium nitrate, gives rise to the corresponding diazonium salt. This shows all the reactions of an aromatic diazonium compound. They can be used as reagents for insolubilizing dyes or dye intermediates, or they can be coupled with the usual azo coupling components to produce colored compounds of high molecular weight.

The process of the invention produces new compounds, usually as mixtures of compounds differing in the length of the taxomon chain and the number of nitro or amino groups. The preferred compounds can be represented by the formula $$Y-(A_n-H_x)-Z.W_z$$

wherein $n$ is an integer having an average value of from 2 to 30, $x$ is an integer having an average value of from 2 to $2n$, $(A)_n$ is a divalent radical formed by condensation of a polymerizable aromatic mono-olefinic compound, the end radicals Y and Z are fragments of a molecule YZ which has been made to react with the olefin, W is a member of the group consisting of $NO_2$ and $NH_2$, and the W groups are substituted for hydrogen (represented by the minus H in the formula) in aromatic nuclei.

Molecular distillation, fractional crystallization or fractional precipitation of the telomer mixture may be employed to isolate individual telomers for nitration. Fractional crystallization is the preferred method in separating individual nitro or amino telomers from mixtures thereof.

The products are useful as intermediates for the production of dispersing agents, surface-active agents, dyestuffs and pigments.

It is apparent that many widely different embodiments of this invention may be made without departing from the spirit and scope thereof, and, therefore, it is not intended to be limited except as indicated in the appended claims.

I claim:

1. A mixture of linear polymeric materials having nitro groups substituted for hydrogen on aromatic carbon of linear polymeric materials having a chain of two to thirty recurring

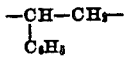

units and, terminally, one —Cl and one —CCl₃ radical.

2. A mixture of linear polymeric materials having nitro groups substituted for hydrogen on aromatic carbon of linear polymeric materials having a chain of two to thirty recurring

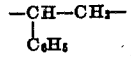

units and, terminally, two monovalent radicals which together make up a polychlorinated methane.

3. A mixture of linear polymeric materials having nitro groups substituted for hydrogen on aromatic carbon of linear polymeric materials having a chain of two to thirty recurring

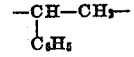

units and, terminally, two monovalent radicals which together make up a polyhalogenated methane.

4. A mixture of linear polymeric materials having amino groups substituted for hydrogen on aromatic carbon of linear polymeric materials having a chain of two to thirty recurring

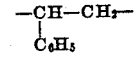

units and, terminally, one —Cl and one —CCl₃ radical.

5. A mixture of linear polymeric materials having amino groups substituted for hydrogen on aromatic carbon of linear polymeric materials having a chain of two to thirty recurring

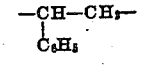

units and, terminally, two monovalent radicals which together make up a polychlorinated methane.

6. A mixture of linear polymeric materials having amino groups substituted for hydrogen on aromatic carbon of linear polymeric materials having a chain of two to thirty recurring

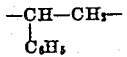

units and, terminally, two monovalent radicals which together make up a polyhalogenated methane.

7. A mixture of linear polymeric materials having nitrogen groups substituted for hydrogen on aromatic carbon of linear polymeric materials having a chain of two to thirty recurring

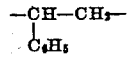

units and, terminally, one —Cl and one —CCl₃ radical, said nitrogen groups being selected from the class consisting of the nitro group and the amino group.

8. A mixture of linear polymeric materials having nitrogen groups substituted for hydrogen on aromatic carbon of linear polymeric materials having a chain of two to thirty recurring

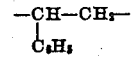

units and, terminally, two monovalent radicals which together make up a polychlorinated methane, said nitrogen groups being selected from the class consisting of the nitro group and the amino group.

9. A mixture of linear polymeric materials having nitrogen groups substituted for hydrogen on aromatic carbon of linear polymeric materials having a chain of two to thirty recurring

units and, terminally, two monovalent radicals which together make up a polyhalogenated methane, said nitrogen groups being selected from the class consisting of the nitro group and the amino group.

10. A mixture of linear polymeric materials having nitro groups substituted for hydrogen on aromatic carbon of linear polymeric materials having a chain of two to thirty recurring

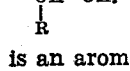

units, wherein R is an aromatic radical of from six to ten carbon atoms, and, terminally, one —Cl and one —CCl₃ radical.

11. A mixture of linear polymeric materials having nitro groups substituted for hydrogen on aromatic carbon of linear polymeric materials having a chain of two to thirty recurring

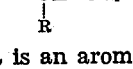

units, wherein R is an aromatic radical of from six to ten carbon atoms, and, terminally, two monovalent radicals which together make up a polychlorinated methane.

12. A mixture of linear polymeric materials having nitro groups substituted for hydrogen on aromatic carbon of linear polymeric materials having a chain of two to thirty recurring

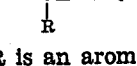

units, wherein R is an aromatic radical of from six to ten carbon atoms, and, terminally, two monovalent radicals which together make up a polyhalogenated methane.

13. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, one —Cl and one —CCl$_3$ radical.

14. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, two monovalent radicals which together make up a polychlorinated methane.

15. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, two monovalent radicals which together make up a polyhalogenated methane.

16. A mixture of linear polymeric materials having nitrogen groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, one —Cl and one —CCl$_3$ radical, said nitrogen groups being selected from the class consisting of the nitro group and the amino group.

17. A mixture of linear polymeric materials having nitrogen groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, two monovalent radicals which together make up a polychlorinated methane, said nitrogen groups being selected from the class consisting of the nitro group and the amino group.

18. A mixture of linear polymeric materials having nitrogen groups substituted for hydrogen on aromatic carbon of linear polymeric materials having a chain of two to thirty recurring $$-CH-CH_2-$$
$$|$$
$$R$$

units, wherein R is an aromatic radical of from six to ten carbon atoms, and, terminally, two monovalent radicals which together make up a polyhalogenated methane, said nitrogen groups being selected from the class consisting of the nitro group and the amino group.

19. A mixture of linear polymeric materials having nitro groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, one —Cl and one —CCl$_3$ radical.

20. A mixture of linear polymeric materials having nitro groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, two monovalent radicals which together make up a polychlorinated methane.

21. A mixture of linear polymeric materials having nitro groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, two monovalent radicals which together make up a polyhalogenated methane.

22. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, one —Cl and one —CCl$_3$ radical.

23. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, two monovalent radicals which together make up a polychlorinated methane.

24. A mixture of linear polymeric materials having amino groups substituted for hydrogen on aromatic carbon of linear polymeric materials having a chain of two to thirty recurring $$-CH-CH_2-$$
$$|$$
$$R$$

units, wherein R is an aromatic hypdrocarbon radical of from six to ten carbon atoms, and, terminally, two monovalent radicals which together make up a polyhalogenated methane.

25. A mixture of linear polymeric materials having nitrogen groups substituted for hydrogen on aromatic carbon of linear polymeric materials having a chain of two to thirty recurring $$-CH-CH_2-$$
$$|$$
$$R$$

units, wherein R is an aromatic hydrocarbon radical of from six to ten carbon atoms, and, terminally, one —Cl and one —CCl$_3$ radical, said nitrogen groups being selected from the class consisting of the nitro group and the amino group.

26. A mixture of linear polymeric materials having nitrogen groups substituted for hydrogen or aromatic carbon of linear polymeric materials having a chain of two to thirty recurring $$-\underset{\underset{R}{|}}{CH}-CH_2-$$

units, wherein R is an aromatic hydrocarbon radical of from six to ten carbon atoms, and, terminally, two monovalent radicals which together make up a polychlorinated methane, said nitrogen groups being selected from the class consisting of the nitro group and the amino group.

27. A mixture of linear polymeric materials having nitrogen groups substituted for hydrogen on aromatic carbon of linear polymeric materials having a chain of two to thirty recurring $$-\underset{\underset{R}{|}}{CH}-CH_2-$$

units, wherein R is an aromatic hydrocarbon radical of from six to ten carbon atoms, and, terminally, two monovalent radicals which together make up a polyhalogenated methane, said nitrogen groups being selected from the class consisting of the nitro group and the amino group.

WILLIAM E. HANFORD.

Certificate of Correction

Patent No. 2,396,786.

March 19, 1946.

WILLIAM E. HANFORD

It is hereby certified that errors appear in the printed specification of the above numbered patent requiring correction as follows: Page 4, second column, line 59, claim 24, for "hypdrocarbon" read *hydrocarbon*; page 5, first column, line 3, claim 26, for "or aromatic" read *on aromatic*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*